United States Patent [19]

Browall

[11] 3,980,456
[45] Sept. 14, 1976

[54] METHOD FOR SEALING BREACHES IN MULTI-LAYER ULTRATHIN MEMBRANE COMPOSITES

[75] Inventor: Warella R. Browall, Scotia, N.Y.

[73] Assignee: General Electric Company, Schenectady, N.Y.

[22] Filed: Mar. 31, 1975

[21] Appl. No.: 563,708

[52] U.S. Cl. .................................. 55/158; 55/16; 156/94; 427/140; 428/320; 428/412; 210/500 M
[51] Int. Cl.² .................. B01D 53/22; B32B 35/00
[58] Field of Search ............ 156/229, 242, 246, 94; 55/16, 158; 210/23 H, 23 F, 500 M; 427/140; 428/200, 213, 214, 216, 320, 412

[56] References Cited
UNITED STATES PATENTS

| | | | |
|---|---|---|---|
| 3,325,330 | 6/1967 | Robb | 156/229 |
| 3,650,808 | 3/1972 | Gagnon | 428/412 |
| 3,852,135 | 12/1974 | Cook et al. | 210/500 M |
| 3,874,986 | 4/1975 | Browall et al. | 428/412 |

*Primary Examiner*—John Adee
*Attorney, Agent, or Firm*—Leo I. MaLossi; Joseph T. Cohen; Jerome C. Squillaro

[57] ABSTRACT

A method is described for sealing pinholes and covering imperfections passing through a multi-layer membrane composite to be employed for conducting a gas separation process. The particular breaches through such composites that this invention is intended to deal with are those caused by the unavoidable presence of particles smaller than about 3000 A. By this method an additional ultrathin membrane of very flexible, permeable polymer material is applied over the outer surface of the membrane composite.

7 Claims, 1 Drawing Figure

U.S. Patent  Sept. 14, 1976  3,980,456
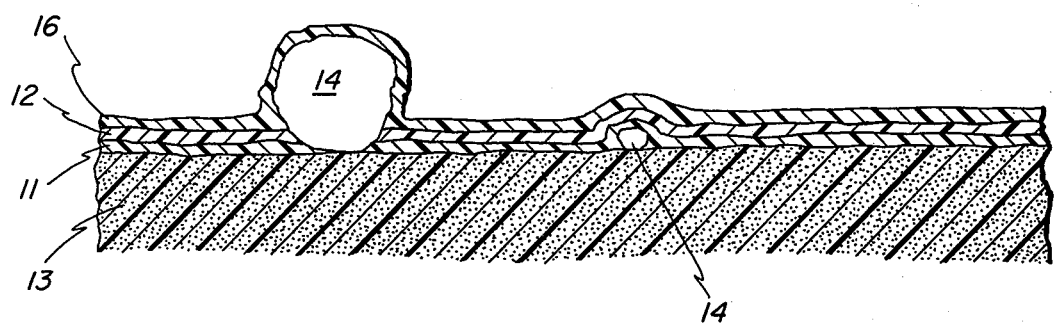

METHOD FOR SEALING BREACHES IN MULTI-LAYER ULTRATHIN MEMBRANE COMPOSITES

The preparation of ultrathin membranes is described in U.S. Pat. application Ser. No. 536,650 to Ward, filed Dec. 26, 1974 and in the parent application thereof, now abandoned. The Ward application is assigned to the assignee of the instant application. Pertinent description is found in the specification of Ser. No. 536,650 in the portion from page 5, line 16 through page 8, line 17 and the portion from page 11, line 22 through page 26, line 6. The above portions of the specification are incorporated by reference.

BACKGROUND OF THE INVENTION

A unified laminate of layers of polymer to which the instant invention has been successfully applied is described in U.S. Pat. application Ser. No. 471,320 to Browall et al., filed May 20, 1974. The Browall et al. (now U.S. Pat. No. 3,874,986) application is assigned to the assignee of the instant invention and is incorporated by reference. The laminate in the Browall et al. application consists of a first layer of microporous substrate, a second layer of polyphenylene oxide (PPO)-/organopolysiloxane-polycarbonate and a third layer of organopolysiloxane-polycarbonate copolymer disposed between the first and second layers. The second and third membrane laminate (layers) are ultrathin films such as are prepared by the invention in Ser. No. 536,650 to Ward.

In a typical membrane composite, such as that described in the Browall et al. application, the microporous sheet will be about 5 mils thick while the physical thickness of the laminate of ultrathin membranes does not exceed about 300 A (equivalent to about $11.8 \times 10^{-4}$ mil).

It has been found in the pilot production of such membranes that, because clean room techniques and chemical filters are not effective to exclude from the manufacturing area particulate matter below about 3000 A in size, the deposition of such very fine particulate foreign matter under and/or between the ultrathin polymer membrane layers is unavoidable. Because such particulate matter depositing under the ultrathin layers can be as much as 10 times as large as the sum of the thicknesses of the ultrathin layers, such particles can puncture one or both of these ultrathin layers and result in pinhole-size breaches through the membrane gas separation system. The effectiveness of gas separation by such membrane structures is diminished by the presence of such breaches.

It is, therefore, necessary in the fabrication of such membrane composites to maintain a station at which such leaks may be located as by the use of a dye check and spot patching of major leak spots may be accomplished. However, minor smaller leaks cannot be efficiently and economically cured in this manner.

U.S. Pat. No. 3,325,330 to Robb teaches that by bringing two partially cured films of organopolysiloxane together with sufficient pressure to exclude air from between the laminated films, the defects in one film are unlikely to be aligned with defects in the second film. In the Robb process of making films, however, it is required that the films (each initially about 2 mils thick) be stretched thin and then be cured to the solid, elastic state. Composite films as thin as about 0.1 mil are prepared in this manner. However, there is no indication (or likelihood) that the presence of particulate matter 10 times as thick as the composite film thickness (i.e. ranging to 1 mil in thickness) could be tolerated within the laminate, the problem to which the instant invention addresses itself.

The need has, therefore, arisen for a method for economically and effectively sealing both major and minor leak spots in the manufacture of laminates of ultrathin films.

The term "basic ultrathin membrane composite" describes the laminate containing all the laminae required to prepare a composite membrane able to function for gas separation in an effective manner when free of pinholes and imperfections and mounted on adequate support structure.

The term "layer" as employed herein includes a unified lamina consisting of one or more ultrathin films of a given material (e.g. PPO, organopolysiloxane-polycarbonate copolymer) in which the films are strongly bonded together, but need not merge.

DESCRIPTION OF THE INVENTION

The elimination of breaches through basic ultrathin membrane composites caused by the presence of ultrafine particulate foreign matter is related to the particular gas separation for which the membrane composite is to be employed. First, a sealing polymer material is selected (a) from which ultrathin (e.g. less than 500 A thick) membranes may be cast, (b) is very flexible, (c) is several times more permeable to the passage of the gaseous component of interest than the basic ultrathin membrane composite, (d) is less selective to the gaseous component of interest than the basic ultrathin membrane composite and (e) will readily adhere to the outer surface of the basic ultrathin membrane composite. Next, the sealing polymer material is cast in the form of an ultrathin membrane and then the entire outer surface of the basic ultrathin membrane composite is covered therewith.

By adhering to the criteria set forth hereinabove for the selection of the sealing polymer material, it is found that the overcoat ultrathin membrane effectively seals pinholes draping itself over particles as thick as about 3000 A that had breached the basic ultrathin membrane composite. In this manner the gas separation performance of the basic ultrathin membrane composite is significantly upgraded without significantly reducing the flux of the gaseous component of interest therethrough. These latter results were unexpected and became apparent only upon actual testing of membrane structure prepared according to this invention.

BRIEF DESCRIPTION OF THE DRAWING

This invention and the various aspects thereof will be better understood from the following description and the drawing schematically illustrating the problem encountered in the preparation of a basic ultrathin membrane composite by the unavoidable presence of particulate matter large in proportion to the thickness of the membrane composite and the repair of breaches in the membrane composite occasioned thereby.

MANNER AND PROCESS OF MAKING AND USING THE INVENTION

The ultrathin non-porous membranes for use in the practice of this invention are prepared by the Ward process by casting on a confined liquid surface. A pair of movable longitudinally-extending barriers initially spaced apart a small distance and in contact with the liquid surface are employed, first, to accommodate the casting solution therebetween and second by relative separation thereof to controllably permit spreading of the casting solution over the surface of the film-support liquid. Water is the preferred film support liquid.

Sealing polymer materials of particular importance in the sealing of membrane composites for $O_2/N_2$ separation are those which include repeating units comprising bisphenol-A-polycarbonate units and dimethylsiloxane units and those which include repeating units in alternating blocks of bisphenol-A polycarbonate units and dimethylsiloxane units, such copolymer being described in U.S. Pat. No. 3,189,662 to Vaughn, Jr., incorporated by reference. Organopolysiloxane-polycarbonate copolymer in which alternating blocks of repeating bisphenol-A polycarbonate units and repeating dimethylsiloxane units are present can be prepared following the teachings of Vaughn above, the resulting materials being alternating, random, block polymers of the —ABABA— type in which the blocks are polydisperse:

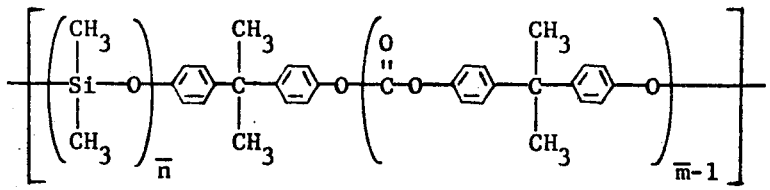

Polymer weight average molecular weight lies in the range of 15,000 to 50,000, n and m being selected to accommodate these values. Individual film thicknesses (after desolvation) will range from about 100 A to about 500 A.

The preferred solvent for the organopolysiloxane-polycarbonate copolymer is 1,2,3-trichloropropane (TCP).

Removal of the film from the surface of the film-forming solution as part of the laminate is most easily accomplished by vacuum-pickup as described in the Ward application. Apparatus for the film pickup in its simplest form consists of a closed chamber having one porous wall (e.g. a barrier of sintered metal particles) at least the size of the area of film to be recovered. Initially a vacuum is drawn on the chamber after the porous wall has been covered with a layer of the microporous substrate and the substrate is brought into contact with the desolvated film. The solidified film is pulled against the surface of the microporous substrate. Subsequent films may be picked up in the same manner with each new film sticking to the earlier deposited one. Bubbles of gas entrapped between films are not a problem as long as the vacuum is pulled, as the gas is gradually withdrawn from the bubbles by permeation and the film adjusts itself, shrinking as the gas leaves.

A typical casting solution for organopolysiloxane-polycarbonate ultrathin sealant (or overcoat) films is 2–4% by weight of organopolysiloxane-polycarbonate [60% $SiO(CH_3)_2$; 20 $SiO(CH_3)_2$ units per block] copolymer in TCP.

In general, any polymer or copolymer, including polymer blends, grafts, blocks and interpolymers capable of formation into substantially whole-free films by solvent casting and meeting the other criteria set forth hereinabove in the "Description of the Invention" may be employed as the sealant film.

The polymer used may be natural or a synthetic substance. In the latter instance, both addition and condensation polymers are included. Organic, inorganic or mixed organic and inorganic polymers may be used. Typical of the useful polymers will be those having repeating units selected from the group consisting of arylene ether, organopolysiloxane, aromatic carbonate, alkyl acrylate or alkyl methacrylate units or mixtures of any of the foregoing and blends, grafts, blocks or interpolymers comprised of such units.

Having determined at a laboratory-scale a desirable basic ultrathin membrane composite construction for a given gas separation, e.g. the consolidation of ultrathin non-porous layers 11 and 12 on microporous polymer substrate 13 as shown in the drawing, it then becomes necessary to produce such a construction on a commercial scale. In the transition to pilot-, or full-scale, production the introduction of particulate foreign matter by working personnel will be found to be unavoidable even in a properly designed clean room. An effective, economical method must be found to heal the breaches, both small and large, caused by incorporation of such particles 14 in the film. The solution according to this invention is to overlay the basic ultrathin membrane composite with sealant ultrathin layer 16.

A sealant material is selected applying the criteria recited above in the "Description of the Invention". Next, the sealant material is provided as an ultrathin membrane. This ultrathin sealant membrane is then applied over the basic ultrathin membrane composite as shown. This new sealed composite is then tested to ascertain whether the added sealant layer has in fact been able to accommodate such particles as is shown at 14 and can thereby provide the desired sealing of pinholes and healing of imperfections. In addition, checks are run on the selectivity of the gas separation with the new sealed composite and the flux therethrough of the desired gaseous component is tested in order to determine whether a new selection should be made for the sealing material to be used.

BEST MODE CONTEMPLATED

Very successful sealing for the laminate membrane construction disclosed in the above-identified Browall et al. application has been achieved by applying an ultrathin organopolysiloxane-polycarbonate copolymer membrane over the outer polyphenylene/oxide/organopolysiloxane-polycarbonate copolymer surface thereof.

Thus, oxygen separation membrane laminates have been prepared consisting of an 80% by weight PPO/20% by weight organopolysiloxane-polycarbonate ultrathin non-porous layer over a 100% organopolysiloxane-polycarbonate ultrathin non-porous layer with the composite thereof being supported on a microporous polycarbonate sheet. The preparation of the microporous polycarbonate sheet is described in U.S. Pat. application Ser. No. 456,970 by Salemme, filed Apr. 1, 1974 and assigned to the assignee of the instant invention. The Salemme patent application is incorporated by reference. Thickness of the microporous sheet was about 5 mils and the thickness of the ultrathin membrane laminate construction was less than about 300 A before the application of the organopolysiloxane-polycarbonate copolymer sealing layer.

The resulting substantially breach-free laminate thus consisted of an 80% by weight PPO/20% by weight organopolysiloxane-polycarbonate copolymer layer between two 100% organopolysiloxane-polycarbonate copolymer layers with this laminate being supported on a microporous polycarbonate sheet. Dye checking of gas exchange flow cell structures embodying these membranes showed very few, if any, defects (only about two defects per cell). The flow cells were used to conduct oxygen separation from air and the percent oxygen in the extract ranged from 45.5 to 46.7% by volume. The flux ranged from 10 to 11 cc/sec/ft$^2$.

In the following examples (as shown in the drawing) ultrathin layer 11 and overcoat layer 16 were each cast from solution of 4% (grams of solids per 100 milliliters of solvent) organopolysiloxane-polycarbonate copolymer in TCP. Ultrathin layer 12 was cast from a solution of 1% (grams of solids per 100 milliliters of solvent) PPO (80% by weight)/organopolysiloxane-polycarbonate copolymer (20% by weight) in trichloroethylene. In Examples 1-4 the composites were tested and were found to provide oxygen concentrations in the extract stream from 45.5 to 46.7% by volume. In each case water was used as the casting liquid.

EXAMPLE 1

In this composite the amount of casting solution used for each of layers 11 and 16 was 0.20 ml, about twice the amount (0.12 ml) used in layer 12.

EXAMPLE 2

In this composite the amount of casting solution used for layer 11 was 0.20 ml while the amount used in each of layers 12 and 16 was 0.12 ml.

EXAMPLES 3 and 4

In these composites the amounts of casting solution used for each of layers 11, 12 and 16 are the same (0.12 ml).

Whereas flow cells prepared using membrane structures consisting solely of layer 13 (microporous polycarbonate), layer 11 (ultrathin organopolysiloxane-polycarbonate) and layer 12 [ultrathin PPO(80% by weight)/ organopolysiloxane-polycarbonate copolymer (20% by weight)] required an average of about 20 patches per flow cell with RTV silicone rubber to produce a useful flow cell, flow cells having the same membrane area prepared in Examples 1-4 only required about one RTV silicone rubber patch per flow cell.

The effectiveness of the sealing action of the organopolysiloxane-polycarbonate overcoat was determined by comparative gas separation tests of the same basic structure before and after the application thereto of the sealing layer. Thus, the original 2-layer structure (80% by weight PPO/20% by weight organopolysiloxane-polycarbonate over 100% organopolysiloxane-polycarbonate) was used in a flow cell to separate oxygen from air. A volume of 38% oxygen was obtained in the extract with the membrane composite in this configuration. When the ultrathin sealing membrane 16 of organopolysiloxane-polycarbonate was applied thereto and the flow cell was retested, the oxygen concentration in the extract increased to 45.3% by volume. This very substantial increase in the effectiveness of gas separation was accomplished without significant reduction of flux and without need for any patching.

The sealing material chosen for the practice of this invention, therefore, must be less selective to the specific gas of interest than is the basic ultrathin membrane composite (or the active layer thereof), must exhibit at least about 3.5 times the permeability to the specific gas of interest exhibited by the basic ultrathin membrane composite, should exhibit at least about 200% elongation and must be capable of bonding directly to the outer surface of the basic ultrathin membrane composite. The preferred stretchability is obtained by using a sealing material exhibiting about 400% elongation.

What I claim as new and desire to secure by Letters Patent of the United States is:

1. In the method of preparing ultrathin membrane structures intended for use in the separation of a specific gas from a gas mixture wherein at least one ultrathin membrane layer for accomplishing said gas separation is applied over a smooth microporous substrate to form a basic ultrathin membrane composite and breaches through said at least one layer are patched, the improvement comprising the steps of:
    a. casting a non-porous ultrathin film from a sealing material of high flexibility exhibiting at least about 3.5 times the permeability to said specific gas as the material of said at least one layer, being less selective to said specific gas than the material of said at least one layer and being directly bondable to said at least one layer and
    b. applying said non-porous film of sealing material over said composite covering the outer surface of said at least one layer whereby the need for patching is greatly reduced.

2. The improvement of claim 1 wherein the sealing material is organopolysiloxane-polycarbonate copolymer.

3. The improvement of claim 2 wherein at least one ultrathin membrane layer presents an outer surface of polyphenylene oxide/organopolysiloxane-polycarbonate before the film of sealing material is applied thereto.

4. A composite consisting of ultrathin polymer layers supported on a microporous backing layer, said polymer layers forming a unified non-porous laminate of a polyphenylene oxide/organopolysiloxane-polycarbonate copolymer layer disposed between and bonded to layers of organopolysiloxane-polycarbonate.

5. The composite of claim 4 wherein the backing layer is microporous polycarbonate.

6. The improvement of claim 1 wherein the sealing material exhibits at least about 200% elongation.

7. The improvement of claim 1 wherein the sealing material exhibits at least about 400% elongation.

* * * * *